(12) United States Patent
McCann

(10) Patent No.: US 9,668,134 B2
(45) Date of Patent: *May 30, 2017

(54) METHODS, SYSTEMS, AND COMPUTER READABLE MEDIA FOR PROVIDING ACCESS NETWORK PROTOCOL INTERWORKING AND AUTHENTICATION PROXYING

(71) Applicant: Oracle International Corporation, Redwood Shores, CA (US)

(72) Inventor: Thomas Matthew McCann, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/827,015

(22) Filed: Aug. 14, 2015

(65) Prior Publication Data

US 2017/0048703 A1 Feb. 16, 2017

(51) Int. Cl.
*H04M 1/66* (2006.01)
*H04W 12/06* (2009.01)
*H04W 84/04* (2009.01)

(52) U.S. Cl.
CPC .......... *H04W 12/06* (2013.01); *H04W 84/042* (2013.01)

(58) Field of Classification Search
CPC ..... H04W 12/06; H04W 8/18; H04W 64/003; H04W 88/16; H04W 12/04; H04W 4/24;
(Continued)

(56) References Cited

U.S. PATENT DOCUMENTS 1,872,857 A 4/1931 Wesson et al.
5,878,347 A 3/1999 Joensuu et al.
(Continued)

FOREIGN PATENT DOCUMENTS

CN 1809072 A 7/2006
CN 101001440 A 7/2007
(Continued)

OTHER PUBLICATIONS

Commonly-assigned, co-pending U.S. Appl. No. 14/929,283 for "Methods, Systems, and Computer Readable Media for Remote Access Dial in User Service (RADIUS) Proxy and Diameter Agent Address Resolution," (Unpublished, filed Oct. 31, 2015).

(Continued)

*Primary Examiner* — Nimesh Patel
(74) *Attorney, Agent, or Firm* — Jenkins, Wilson, Taylor & Hunt, P.A.

(57) ABSTRACT

The subject matter described herein includes methods, systems, and computer readable media for access network protocol interworking and authentication proxying. One method includes receiving an authentication request from a node in an access network for authenticating a user using cellular network authentication. The method further includes, in response to the request, using a native protocol of the cellular network to obtain an authentication challenge from a node in the cellular network. The method further includes communicating the authentication challenge to the node in the access network. The method further includes receiving a response to the authentication challenge from the node in the access network. The method further includes determining whether the response matches an expected response. The method further includes, in response to determining that the response matches the expected response, (Continued)

communicating an indication of successful authentication to the node in the access network.

7 Claims, 16 Drawing Sheets

(58) Field of Classification Search
CPC ......... H04W 28/0289; H04W 28/0215; H04W 28/12; H04W 88/08; H04W 28/0236; H04W 4/08; H04W 40/00; H04W 84/18; H04W 80/04; H04W 40/248; H04W 40/02; H04W 40/246; H04W 40/26; H04W 40/36; H04W 84/005; H04W 88/04; H04W 92/02; H04W 40/22; H04W 74/00; H04W 8/04; H04W 12/08; H04M 15/04; H04M 15/66
See application file for complete search history.

(56) References Cited

U.S. PATENT DOCUMENTS

| | | |
|---|---|---|
| 6,006,098 A | 12/1999 | Rathnasabapathy et al. |
| 6,298,383 B1 | 10/2001 | Gutman et al. |
| 6,836,477 B1 | 12/2004 | West, Jr. et al. |
| 6,967,956 B1 | 11/2005 | Tinsley et al. |
| 7,292,592 B2 | 11/2007 | Rune |
| 7,319,857 B2 | 1/2008 | Baldwin et al. |
| 7,551,926 B2 | 6/2009 | Rune |
| 7,738,488 B2 | 6/2010 | Marsico et al. |
| 7,792,981 B2 | 9/2010 | Taylor |
| 7,814,015 B2 | 10/2010 | Benedyk et al. |
| 7,844,745 B1 | 11/2010 | Darbyshire et al. |
| 7,916,685 B2 | 3/2011 | Schaedler et al. |
| 7,996,541 B2 | 8/2011 | Marathe et al. |
| 8,015,293 B2 | 9/2011 | Schaedler et al. |
| 8,532,110 B2 | 9/2013 | McCann et al. |
| 8,547,908 B2 | 10/2013 | Marsico |
| 8,615,237 B2 | 12/2013 | Baniel et al. |
| 8,737,304 B2 | 5/2014 | Karuturi et al. |
| 8,825,060 B2 | 9/2014 | McCann et al. |
| 8,831,076 B2 | 9/2014 | Yen |
| 8,918,469 B2 | 12/2014 | Sprague et al. |
| 8,942,747 B2 | 1/2015 | Marsico |
| 9,059,948 B2 | 6/2015 | Schaedler et al. |
| 9,148,524 B2 | 9/2015 | Deo |
| 9,288,169 B2 | 3/2016 | Schaedler et al. |
| 9,319,378 B2 | 4/2016 | McCann |
| 2001/0028636 A1 | 10/2001 | Skog et al. |
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0098612 A1 | 5/2004 | Lee et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0242227 A1 | 12/2004 | Huotari et al. |
| 2004/0246965 A1 | 12/2004 | Westman et al. |
| 2004/0260816 A1 | 12/2004 | Skog et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0227675 A1 | 10/2005 | Lim et al. |
| 2005/0235000 A1 | 10/2005 | Keil |
| 2006/0002308 A1 | 1/2006 | Na et al. |
| 2006/0030320 A1 | 2/2006 | Tammi et al. |
| 2006/0045249 A1 | 3/2006 | Li et al. |
| 2006/0068762 A1 | 3/2006 | Baldwin et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0161512 A1 | 7/2006 | Schaedler et al. |
| 2006/0172730 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0136590 A1* | 6/2007 | Nah ............... H04W 12/04 713/171 |
| 2007/0153995 A1 | 7/2007 | Fang et al. |
| 2007/0189215 A1 | 8/2007 | Wu et al. |
| 2007/0242637 A1 | 10/2007 | Dynarski et al. |
| 2007/0297419 A1 | 12/2007 | Askerup et al. |
| 2008/0039104 A1 | 2/2008 | Gu et al. |
| 2008/0256251 A1 | 10/2008 | Huotari et al. |
| 2009/0080440 A1 | 3/2009 | Balyan et al. |
| 2009/0089435 A1 | 4/2009 | Terrill et al. |
| 2009/0129271 A1 | 5/2009 | Ramankutty et al. |
| 2009/0177796 A1 | 7/2009 | Falk et al. |
| 2009/0196231 A1 | 8/2009 | Giaretta et al. |
| 2009/0196290 A1 | 8/2009 | Zhao et al. |
| 2009/0221310 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0268814 A1 | 10/2010 | Cross et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0040845 A1 | 2/2011 | Cai et al. |
| 2011/0116378 A1 | 5/2011 | Ramankutty et al. |
| 2011/0116382 A1 | 5/2011 | McCann et al. |
| 2011/0158090 A1* | 6/2011 | Riley ............... H04L 12/14 370/230 |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0211574 A1 | 9/2011 | Li et al. |
| 2011/0225113 A1 | 9/2011 | Mann |
| 2011/0225280 A1 | 9/2011 | Delsesto et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1* | 12/2011 | Kanode ............... H04L 63/0892 709/238 |
| 2012/0089993 A1 | 4/2012 | Alonso Alarcon et al. |
| 2012/0096177 A1 | 4/2012 | Rasanen |
| 2012/0124220 A1 | 5/2012 | Zhou et al. |
| 2012/0155389 A1 | 6/2012 | McNamee et al. |
| 2012/0155470 A1 | 6/2012 | McNamee et al. |
| 2012/0177028 A1* | 7/2012 | Mo ............... H04L 12/1407 370/351 |
| 2012/0201203 A1 | 8/2012 | Miyagawa et al. |
| 2012/0202550 A1 | 8/2012 | Marsico |
| 2012/0207015 A1* | 8/2012 | Marsico ............... H04L 41/0663 370/221 |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1* | 9/2012 | Sprague ............... H04L 63/0892 709/206 |
| 2012/0226814 A1 | 9/2012 | Stucker |
| 2012/0236871 A1 | 9/2012 | Wallace et al. |
| 2012/0239771 A1 | 9/2012 | Rasanen |
| 2012/0311064 A1 | 12/2012 | Deo |

(56) References Cited

U.S. PATENT DOCUMENTS

| | | | |
|---|---|---|---|
| 2013/0171990 A1* | 7/2013 | McCann | H04L 63/0263 455/435.1 |
| 2013/0304843 A1 | 11/2013 | Chow et al. | |
| 2014/0207941 A1* | 7/2014 | McCann | H04L 61/2076 709/224 |
| 2014/0258423 A1 | 9/2014 | Schaedler et al. | |
| 2015/0149656 A1 | 5/2015 | McMurry et al. | |

FOREIGN PATENT DOCUMENTS

| | | |
|---|---|---|
| CN | 101079742 A | 11/2007 |
| CN | 101247321 A | 8/2008 |
| CN | 101277541 A | 10/2008 |
| CN | 101483826 A | 7/2009 |
| CN | 101867873 A | 10/2010 |
| CN | 101945047 A | 1/2011 |
| CN | 102239481 A | 11/2011 |
| CN | ZL 201080065174.6 | 6/2015 |
| CN | 100037 | 7/2016 |
| EP | 1 357 720 A1 | 10/2003 |
| EP | 1 630 999 A1 | 3/2006 |
| EP | 2 107 725 A1 | 10/2009 |
| EP | 2 242 205 A1 | 10/2010 |
| EP | 2 220 841 B1 | 9/2011 |
| EP | 1 846 832 B1 | 4/2012 |
| EP | 2 466 828 A1 | 6/2012 |
| EP | 2 522 103 A2 | 11/2012 |
| EP | 2 577 930 A2 | 4/2013 |
| EP | 2 681 940 B1 | 5/2016 |
| EP | 2 681 939 B1 | 9/2016 |
| JP | H10-98470 A | 4/1998 |
| JP | H11-224219 A | 8/1999 |
| JP | 2004-242326 A | 8/2004 |
| JP | 2006-513631 | 4/2006 |
| JP | 4041038 B2 | 1/2008 |
| JP | 2009-537102 | 10/2009 |
| JP | 2010-527520 | 8/2010 |
| JP | 2010-0278884 A | 12/2010 |
| JP | 2013-527999 T | 7/2013 |
| JP | 5732550 B2 | 6/2015 |
| JP | 5758508 B2 | 8/2015 |
| JP | 5759064 B2 | 8/2015 |
| JP | 5938052 B2 | 6/2016 |
| JP | 5950943 B2 | 7/2016 |
| WO | WO 2004/064442 A1 | 7/2004 |
| WO | WO 2006/066149 A2 | 6/2006 |
| WO | WO 2009/058067 A1 | 5/2009 |
| WO | WO 2009/070179 A1 | 6/2009 |
| WO | WO 2009/086759 A1 | 7/2009 |
| WO | WO 2010/139360 A1 | 12/2010 |
| WO | WO 2011/082035 A2 | 7/2011 |
| WO | WO 2011/082090 A2 | 7/2011 |
| WO | WO 2011/082895 A1 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

Commonly-assigned, co-pending U.S. Appl. No. 14/928,660 for "Methods, Systems, and Computer Readable Media for Remote Authentication Dial in User Service (RADIUS) Message Loop Detection and Mitigation," (Unpublished, filed Oct. 30, 2015).

Commonly-assigned, co-pending U.S. Appl. No. 14/826,289 for "Methods, Systems, and Computer Readable Media for Providing Access Network Session Correlation for Policy Control," (Unpublished, filed Aug. 14, 2015).

Commonly-assigned, co-pending U.S. Appl. No. 14/827,025 for "Methods, Systems, and Computer Readable Media for Providing Access Network Signaling Protocol Interworking for User Authentication," (Unpublished, filed Aug. 14, 2015).

Fajardo et al., "Diameter Base Protocol," RFC 6733, pp. 1-152 (Oct. 2012).

"Traffix Signaling Delivery Controller—One Platform to Deliver the Wonders of 4G," Traffix Systems, The Diameter Control Plane Experts, pp. 1-7 (2011).

"Traffix Signaling Delivery Controller (SDC)," Traffix Systems, The Diameter Control Plane Experts, pp. 1-5 (2011).

"Traffix Signaling Delivery Controller (SDC) Diameter Gateway—Use Case Development Scenarios," Traffix Systems, The Diameter Control Plane Experts, www.traffixsystems.com pp. 1-4 (2011).

"Traffix Signaling Delivery Controller Diameter Load Balancer Scalability for your Control Plane," Traffix Systems, The Diameter Control Plane Experts, www.traffixsystems.com pp. 1-3 (2011).

Gundavelli et al., "Network Mobility (NEMO) Management Information Base," RFC 5488, pp. 1-44 (Apr. 2009).

Arkko et al., "Extensible Authentication Protocol Method for 3rd Generation Authentication and Key Agreement (EAP-AKA)," RFC 4187, pp. 1-79 (Jan. 2006).

Haverinen et al., "Extensible Authentication Protocol Method for Global System for Mobile Communications (GSM) Subscriber Identity Modules (EAP-SIM)," RFC 4186, pp. 1-80 (Jan. 2006).

Aboba et al., "Extensible Authentication Protocol (EAP)," RFC 3748, pp. 1-67 (Jun. 2004).

Calhoun et al., "Diameter Base Protocol," RFC 3588, pp. 1-147 (Sep. 2003).

Aboba et al., "RADIUS (Remote Authentication Dial in User Service) Support for Extensible Authentication Protocol (EAP)," RFC 3579, pp. 1-46 (Sep. 2003).

"ITP Operations Manual," Cisco Systems, Inc., pp. 1-320 (May 1, 2002).

"Configuring ITP Optional Features," IP Transfer Point, Cisco Systems, Inc., pp. 29-76 (2001).

"Cisco IP Transfer Point Q & A," Cisco Systems, Inc., pp. 1-15 (1992-2001).

Rigney et al., "RADIUS Accounting," RFC 2866, pp. 1-28 (Jun. 2000).

Letter Regarding Decision to Grant a Chinese Patent for Chinese Patnet Application No. ZL201280019607.3 (Oct. 10, 2016).

Notification of the Second Office Action for Chinese Patent Application No. 201280013938.6 (Oct. 9, 2016).

Notification of the Second Office Action for Chinese Patent Application No. 201280018288.4 (Sep. 5, 2016).

Communication under Rule 71(3) EPC for European Patent Application No. 12 751 812.4 (Sep. 2, 2016).

Non-Final Office Action for U.S. Appl. No. 14/827,025 (Aug. 26, 2016).

Decision to grant a European patent pursuant to Article 97(1) EPC for European Patent Applicaton No. 12751986.6 (Aug. 19, 2016).

Intent to Grant for European Patent Application No. 10841605.8 (Aug. 12, 2016).

Letter Regarding Office Action for Japanese Patent Application No. 2015-553784 (Jul. 19, 2016).

Letter Regarding Notice of Grant for Chinese Patent Application No. ZL201280018297.3 (Jul. 4, 2016).

Communication under Rule 71(3) EPC for European Application No. 12 751 986.6 (Jun. 8, 2016).

Letter Regarding Notice of grant for Japanese Patent Application No. 2013-552714 (May 31, 2016).

Decision to grant a European patent pursuant to Article 97(1) EPC for European Application No. 12752952.7 (Apr. 29, 2016).

Official Notice of Grant for Japanese Patent Application No. 2013-556860 (Apr. 26, 2016).

Notification of the First Office Action for Chinese Patent Application No. 201280018298.8 (Mar. 3, 2016).

Communication pursuant to Article 94(3) EPC for European Patent Application No. 10841605.8 (Feb. 22, 2016).

Communication under Rule 71(3) EPC for European Patent Application No. 12752952.7 (Feb. 10, 2016).

(56) References Cited

OTHER PUBLICATIONS

Letter Regarding Notice of Grant for Japanese Patent Application No. 2013-556855 (Feb. 2, 2016).
Notification of the First Office Action for Chinese Application No. 201280019607.3 (Feb. 1, 2016).
Notification of the First Office Action for Chinese Application No. 201280013938.6 (Jan. 27, 2016).
Notification of the First Office Action for Chinese Application No. 201280018297.3 (Jan. 15, 2016).
Notification of the First Office Action for Chinese Application No. 201280018288.4 (Dec. 29, 2015).
Communication pursuant to Article 94(3) EPC for European Application No. 12 751 986.6 (Dec. 22, 2015).
Notice of Allowance and Fee(s) Due for U.S. Appl. No. 13/748,547 (Dec. 11, 2015).
Letter Regarding Office Action for Japanese Patent Application No. 2013-552714 (Dec. 8, 2015).
Letter Regarding Final Rejection for Japanese Patent Application No. 2013-556860 (Nov. 17, 2015).
Communication of European publication number and information on the application of Article 67(3) EPC for European Application No. 14702996.1 (Nov. 4, 2015).
Notice of Allowance and Fee(s) Due and Applicant-Initiated Interview Summary for U.S. Appl. No. 14/190,071 (Oct. 30, 2015).
Advisory Action for U.S. Appl. No. 13/748,547 (Oct. 16, 2015).
Supplemental Notice of Allowability & Response to Rule 312 Communication for U.S. Appl. No. 13/465,552 (Aug. 27, 2015).
Final Office Action for U.S. Appl. No. 13/748,547 (Aug. 10, 2015).
Letter Regarding Publication of Patent for Japanese Patent Application No. 2014-509509 (Aug. 5, 2015).
Letter Regarding Publication of Patent for Japanese Patent Application No. 2013-556857 (Aug. 5, 2015).
Letter Regarding Office Action for Japanese Patent Application No. 2013-556860 (Jul. 21, 2015).
Non-Final Office Action for U.S. Appl. No. 14/190,071 (Jul. 8, 2015).
Letter Regarding Publication of Patent for Japanese Patent Application No. 2013-556675 (Jun. 10, 2015).
Letter Regarding Notice of Grant for Japanese Patent Application No. 2014-509509 (Jun. 2, 2015).
Letter Regarding Notice of Grant for Japanese Patent Application No. 2013-556857 (May 26, 2015).
Notice of Allowance and Fee(s) Due and Examiner-Initiated Interview Summary for U.S. Appl. No. 13/465,552 (May 20, 2015).
Decision to Grant for Chinese Patent Application No. 201080065174.6 (Apr. 16, 2015).
Second Office Action for Japanese Patent Application No. 2013-556857 (Apr. 14, 2015).
Letter Regarding Notice of Grant for Japanese Patent Application No. 2013-556675 (Mar. 31, 2015).
Letter Regarding Office Action for Japanese Patent Application No. 2013-556855 (Feb. 24, 2015).
Notice of Allowance and Fee(s) Due and Examiner-Initiated Interview Summary for U.S. Appl. No. 13/192,410 (Feb. 12, 2015).
Applicant-Initiated Interview Summary for U.S. Appl. No. 13/465,552 (Feb. 9, 2015).
Notice of Panel Decision from Pre-Appeal Brief Review for U.S. Appl. No. 13/192,410 (Feb. 4, 2015).
Extended European Search Report for European Patent Application No. 12751986.6 (Jan. 20, 2015).
Non-Final Office Action for U.S. Appl. No. 13/748,547 (Jan. 5, 2015).
Supplemental Notice of Allowability for U.S. Appl. No. 13/366,928 (Dec. 26, 2014).
Non-Final Office Action for U.S. Appl. No. 13/465,552 (Oct. 17, 2014).
Letter Regarding Office Action for Japanese Patent Application No. 2013-556675 (Sep. 30, 2014).
Final Office Action for U.S. Appl. No. 13/192,410 (Sep. 25, 2014).
First Office Action for Japanese Application No. 2013-556857 (Sep. 24, 2014).
Notice of Allowance and Fee(s) Due for U.S. Appl. No. 13/366,928 (Sep. 3, 2014).
Extended European Search Report for European Application No. 12752952.7 (Aug. 27, 2014).
Notification of the First Office Action for Chinese Application No. 201080065174.6 (Aug. 13, 2014).
Extended European Search Report for European Application No. 12751783.7 (Jul. 22, 2014).
Extended European Search Report for European Application No. 12751812.4 (Jul. 16, 2014).
Notice of Allowance and Fee(s) Due for U.S. Appl. No. 13/409,893 (Jul. 10, 2014).
Notice of Allowance and Fee(s) Due for U.S. Appl. No. 13/409,914 (Apr. 25, 2014).
Supplemental Notice of Allowability for U.S. Appl. No. 13/409,949 (Apr. 24, 2014).
Notification of Transmittal of the International Search Report and the Written Opinion of the International Searching Authority, or the Declaration for International Patent Application No. PCT/US2014/011548 (Mar. 28, 2014).
Non-Final Office Action for U.S. Appl. No. 13/366,928 (Mar. 21, 2014).
Non-Final Office Action for U.S. Appl. No. 13/192,410 (Feb. 20, 2014).
Communication of European publication number and information on the application of Article 67(3) EPC for European Application No. 12781800.3 (Feb. 12, 2014).
Advisory Action Before the Filing of an Appeal Brief for U.S. Appl. No. 13/366,928 (Feb. 10, 2014).
Extended European Search Report for European Application No. 10841605.8 (Feb. 3, 2014).
Notice of Allowance and Fee(s) Due for U.S. Appl. No. 13/409,949 (Jan. 14, 2014).
Final Office Action for U.S. Appl. No. 13/409,914 (Dec. 30, 2013).
Notification of Publication and Entry into Examination Procedure for Chinese Patent Application No. 201280013938.6 (Dec. 18, 2013).
Communication of European publication number and information on the application of Article 67(3) EPC for European Application No. 12751986.6 (Dec. 11, 2013).
Communication of European publication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (Nov. 13, 2013).
Declaration of Mark Kanode for U.S. Appl. No. 13/409,893 (Nov. 1, 2013).
Advisory Action for U.S. Appl. No. 13/192,410 (Oct. 24, 2013).
Final Office Action for U.S. Appl. No. 13/366,928 (Oct. 23, 2013).
Applicant-Initiated Interview Summary for U.S. Appl. No. 13/192,410 (Oct. 18, 2013).
Final Office Action for U.S. Appl. No. 13/409,949 (Sep. 19, 2013).
Advisory Action Before the Filing of an Appeal Brief for U.S. Appl. No. 13/409,893 (Sep. 13, 2013).
Notice of Allowance and Fee(s) Due for U.S. Appl. No. 12/974,869 (Aug. 19, 2013).
Final Office Action for U.S. Appl. No. 13/192,410 (Aug. 5, 2013).
Final Office Action for U.S. Appl. No. 13/409,893 (Jul. 1, 2013).
Non-Final Office Action for U.S. Appl. No. 13/409,914 (Jun. 7, 2013).
Notice of Allowance and Fee(s) Due for U.S. Appl. No. 13/412,352 (May 28, 2013).
Non-Final Office Action for U.S. Appl. No. 13/366,928 (Mar. 26, 2013).
Non-Final Office Action for U.S. Appl. No. 13/409,949 (Feb. 15, 2013).

(56) References Cited

OTHER PUBLICATIONS

Notice of Allowance and Fee(s) Due for U.S. Appl. No. 13/366,928 (Jan. 7, 2013).
Non-Final Office Action for U.S. Appl. No. 13/192,410 (Dec. 20, 2012).
Non-Final Office Action for U.S. Appl. No. 13/409,893 (Dec. 13, 2012).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/036784 (Nov. 1, 2012).
Non-Final Official Action for U.S. Appl. No. 13/412,352 (Oct. 26, 2012).
Communication of European publication number and information on the application of Article 67(3) EPC for European Patent Application No. 10841605.8 (Oct. 17, 2012).
Notification of Transmital of the International Search Report and the Written Opinion of the International Searching Authority, or the Declaration for International Patent Application No. PCT/US2012/027281 (Jun. 15, 2012).
Notification of Transmittal of the International Search Report and the Written Opinion of the International Searching Authority, or the Declaration for International Application No. PCT/US2012/027263 (Jun. 14, 2012).
Notification of Transmittal of the International Search Report and the Written Opinion of the International Searching Authority, or the Declaration for International Patent Application No. PCT/US2012/027736 (Jun. 12, 2012).
Notification of Transmittal of the International Search Report and the Written Opinion of the International Searching Authority, or the Declaration for International Patent Application No. PCT/US2012/023971 (Jun. 11, 2012).
Notification of Transmittal of the International Search Report and the Written Opinion of the International Searching Authority, or the Declaration for International Patent Application No. PCT/US2012/027269 (Jun. 11, 2012).
"Multi-Protocol Routing Agent User's Guide," 910-6404-001 Revision A, Policy Management, Tekelec, pp. 1-70 (Jun. 2012).
Decision to grant a European patent pursuant to Article 97(1) EPC for European Application No. 05854512.0 (Mar. 15, 2012).
Communication under Rule 71(3) EPC for European application No. 05854512.0 (Nov. 11, 2011).
Notification of the Transmittal of the International Search Report and the Written Opinion of the International Searching Authority, or the Declaration for International Application No. PCT/US2010/061934 (Oct. 25, 2011).
Notice of Allowance and Fee(s) Due for U.S. Appl. No. 11/303,757 (May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
Official Action for U.S. Appl. No. 11/303,757 (Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0, pp. 1-20 (Dec. 2010).
Communication pursuant to Article 94(3) EPC for European Application No. 05 854 512.0 (Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0, pp. 1-130 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0, pp. 1-40 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0, pp. 1-76 (Oct. 2010).
"3rd Generation Partnership Project; Technical Specification Group Services and System Aspects; Telecommunication management; Charging management; Diameter charging applications (Release 9)," 3GPP TS 32.299, V9.4.0, pp. 1-148 (Jun. 2010).
"3rd Generation Partnership Project; Technical Specification Group Services and System Aspects; Telecommunication management; Charging management; Charging architecture and principles (Release 9)," 3GPP TS 32.240, V9.1.0, pp. 1-44 (Jun. 2010).
Znaty, "Diameter, GPRS, (LTE + ePC = EPS), IMS, PCC and SDM," Efort, pp. 1-229 (Part 1 of 2) (May 2010).
Znaty, "Diameter, GPRS, (LTE + ePC = EPS), IMS, PCC and SDM," Efort pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0, pp. 1-11 (Mar. 2010).
Communication pursuant to Article 94(3) EPC for European Application No. 05854512.0 (Feb. 8, 2010).
Final Official Action for U.S. Appl. No. 11/303,757 (Dec. 9, 2009).
"3rd Generation Partnership Project; Technical Specification Group Services and System Aspects; Policy and charging control architecture (Release 9)," 3GPP TS 23.203, V9.3.0, pp. 1-123 (Dec. 2009).
Supplementary European Search Report for European Application No. 05854512.0 (Nov. 17, 2009).
Official Action for U.S. Appl. No. 11/303,757 (May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Chiba et al., "Dynamic Authorization Extensions to Remote Authentication Dial in User Service (RADIUS)," RFC 5176, pp. 1-32 (Jan. 2008).
Restriction Requirement for U.S. Appl. No. 11/303,757 (Oct. 4, 2007).
"Tekelec Announces TekCore IMS Core Platform," pp. 1-2 (Jun. 5, 2006).
"Operator Guidebook to IMS and New Generation Networks and Services," www.morianagroup.com, Second Edition, 480 pgs. (Feb. 2006).
Liu et al., "IBM Technical Library, Introduction to Diameter," pp. 1-9, http://www.ibm.com/developerworks/wireless/library/wi-diameter (Jan. 24, 2006).
Rouse, "Platform," http://searchservervirtualization.techtarget.com/definition/platform, pp. 1-2 (2006-2009).
Camarillo et al., "The 3G IP Multimedia Subsystem (IMS), Merging the Internet and the Cellular Worlds," Second Edition, pp. xvii-427 (2006).

(56) References Cited

OTHER PUBLICATIONS

Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture, Chapter 5: Session Control in the IMS, pp. 29-39, 91-105 (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.50013-008-0, Version 1.0, pp. 1-42 (Dec. 2003).
"Ip Multimedia Subsystem—Charging Architecture," 3GPP2 X.50013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index. htm, 24 pgs. (Downloaded from Internet on Dec. 16, 2005) (Sep. 13, 2001).
Calhoun et al., "Diameter Base Protocol," draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Rigney et al., "Remote Authentication Dial in User Service (RADIUS)," RFC 2865, pp. 1-70 (Jun. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt, pp. 1-21 (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01, pp. 1-208 (Jan. 1998).
Jalava, "Service Routing in 3GPP IP Multimedia Subsystem," Nokia, pp. 1-16 (Publication Date Unknown).

* cited by examiner

METHODS, SYSTEMS, AND COMPUTER READABLE MEDIA FOR PROVIDING ACCESS NETWORK PROTOCOL INTERWORKING AND AUTHENTICATION PROXYING

TECHNICAL FIELD

The subject matter described herein relates to seamlessly authenticating users from non-3GPP access networks, either trusted or untrusted, using a 3GPP core subscriber server, such as an HLR or HSS. More particularly, the subject matter described herein relates to methods, systems, and computer readable media for providing access network protocol interworking and authentication proxying.

BACKGROUND

Mobile communications devices typically have two or more modes for accessing network services. For example, current mobile communications devices may be capable of accessing a cellular network (e.g., a long term evolution (LTE) or 3G network) and a Wi-Fi network. If a mobile communications device accesses the cellular network, through a cellular base station or e-node B, then cellular network authentication procedures occur automatically to authenticate the user to the network. If the device accesses a non-3GPP access network, such as a Wi-Fi network, then the mobile operator may desire automatic authentication to occur based on the subscriber's subscriber identity module (SIM) card. For example, extensible authentication protocol (EAP) authentication can be used between a Wi-Fi access gateway (WAG) and authentication, authorization, and accounting (AAA) server in the network. In such a case, EAP authentication occurs automatically when a subscriber activates his or her mobile communications device and the device attempts to attach to the network. The user is not required to enter authentication credentials.

In light of the different protocols and network nodes involved, there exists a need for seamlessly authenticating Wi-Fi users to cellular networks. Accordingly, there exists a long felt need for methods, systems, and computer readable media for providing access network protocol interworking and authentication proxying.

SUMMARY

The subject matter described herein includes methods, systems, and computer readable media for access network protocol interworking and authentication proxying. One method includes steps performed in a Diameter signaling router. The steps include receiving an authentication request from a node in an access network for authenticating a user using cellular (3GPP) network authentication. The method further includes, in response to the request, using a native protocol of the cellular network to obtain an authentication challenge from a node in the cellular network. The method further includes communicating the authentication challenge to the node in the access network. The method further includes receiving a response to the authentication challenge from the node in the access network. The method further includes determining whether the response matches an expected response. The method further includes, in response to determining that the response matches the expected response, communicating an indication of successful authentication to the node in the access network.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
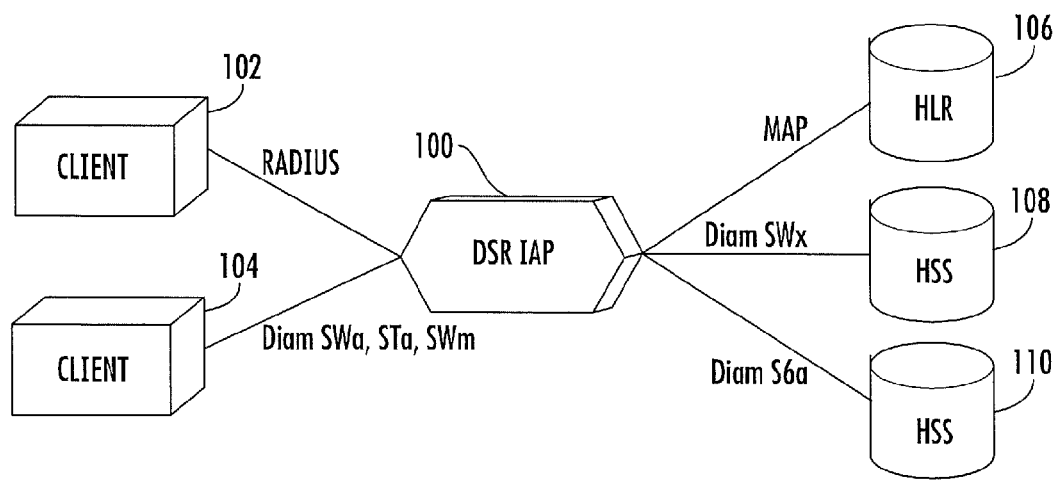
FIG. 1 is a network diagram illustrating a protocol interworking and authentication proxying architecture according to an embodiment of the subject matter described herein.

The subject matter described herein includes methods, systems, and computer readable media for providing access network protocol interworking and authentication proxying. FIG. 1 is a network diagram illustrating a Diameter signaling router (DSR) that performs access network protocol interworking and authentication proxying according to an embodiment of the subject matter described herein. Referring to FIG. 1, a DSR 100 performs the steps described herein for seamlessly authenticating users that access a non-3GPP access network, such as a Wi-Fi network, using authentication information obtained from nodes in the cellular (3GPP) network. In the illustrated example, DSR 100 interfaces with client 102 using RADIUS and with client 104 using Diameter messaging on a Diameter SWa, STa, or SWm interface. Clients 102 and 104 may be Wi-Fi access gateways through which mobile devices connect to a Wi-Fi access network.

DSR 100 communicates with a home location register (HLR) 106 using MAP, with HSS 108 using Diameter messaging on a Diameter SWx interface and with HSS 110 using Diameter messaging on a Diameter S6a interface. DSR 100 may appear as an AAA server to both clients 102 and 104 and nodes 106, 108, and 110. Appearing as an AAA server to clients 102 and 104 may include terminating authentication signaling from clients 102 and 104, obtaining authentication challenge information from nodes 106, 108, and 110, communicating that challenge information to clients 102 and 104, receiving responses to the challenge information, determining whether the challenge responses match the challenge information, and communicating an indication of successful or unsuccessful authentication to nodes 106, 108, and 110. Because DSR 100 is required to store expected result information, DSR 100 is stateful with respect to authentication information.

Figure 2A:
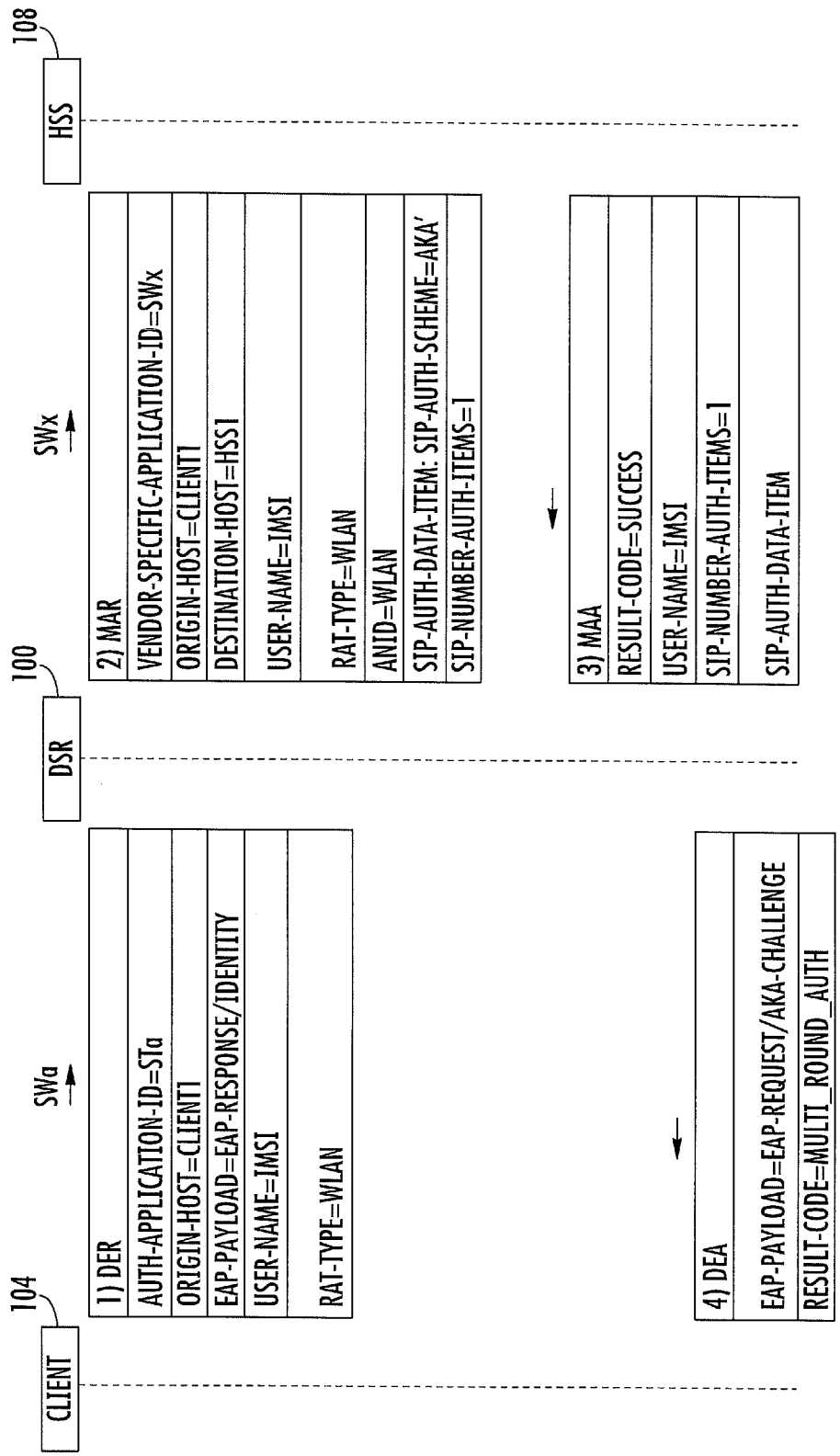
FIG. 2A is a message flow diagram illustrating protocol interworking and authentication proxying performed by a DSR between a Diameter SWa interface and a Diameter SWx interface according to an embodiment of the subject matter described herein.

One type of authentication proxying and protocol interworking performed by DSR 100 is authentication proxying and protocol interworking between a Diameter SWa (or STa, SWm) interface and a Diameter SWx interface. FIG. 2A illustrates an exemplary message flow for Diameter SWa to Diameter SWx interworking and authentication proxying performed by DSR 100 according to an embodiment of the subject matter described herein. Not all AVPs may be shown in the messages. Referring to FIG. 2A, client 104 sends a Diameter extensible authentication protocol (EAP) request (DER) message to DSR 100 on the SWa interface in response to a client seeking cellular network authentication when attempting to access the cellular network through a Wi-Fi network. The base extensible authentication protocol is described in IETF RFC 3748, Extensible Authentication Protocol (EAP), June 2004. RADIUS support for EAP is described in IETF RFC 3579, RADIUS (Remote Authentication Dial In User Service) Support for Extensible Authentication Protocol (EAP), September 2003. EAP methods for third generation authentication are found in IETF RFC 4187, Extensible Authentication Protocol Method for $3^{rd}$ Generation Authentication and Key Agreement (EAP-AKA), January 2006 and IETF RFC 5488, Extensible Authentication Protocol Method for $3^{rd}$ Generation Authentication and Key Agreement (EAP-AKA'), May 2009. The use of EAP for SIM card authentication is described in IETF RFC 4186, Extensible Authentication Protocol Method for Global System for Mobile Communications (GSM) Subscriber Identity Modules (EAP-SIM), January 2006. The disclosure of each of these RFCs is incorporated herein by reference in its entirety.

Returning to FIG. 2A, the DER message includes an EAP payload AVP and information for identifying mobile device from the mobile device's SIM card. In the illustrated example, this information includes the client international mobile station identity (IMSI). The DER message also includes an authentication application identifier identifying the application seeking authentication as an STa application. The DER message identifies client 104 as the origin host. The EAP payload in the message identifies the message as an EAP response including a real or pseudo identifier for the mobile device seeking authentication.

Because the SWx interface is a Diameter interface that does not use the EAP protocol, DSR 100 cannot simply forward the EAP payload to the authenticating entity in the cellular network. Accordingly, DSR 100 terminates the EAP protocol on the SWa interface and issues authentication messaging to HSS 108 according to the native protocol used for authentication by HSS 108. In the illustrated example, the native protocol is Diameter SWx. Accordingly, in response to the DER message, DSR 100 communicates with HSS 108 using a Diameter multimedia-auth-request (MAR) message to obtain authentication vectors. The MAR message includes the IMSI. The MAR message identifies the origin host as client 104 and the destination host as HSS 108. In response to the MAR message, HSS 108 extracts the IMSI from the MAR message and performs a lookup in its subscriber database. If HSS 108 locates a record for the subscriber, HSS 108 extracts authentication vectors, including authentication challenge information to be presented to the mobile device seeking authentication. HSS 108 formulates a multimedia-auth-answer (MAA) message including the authentication challenge information. The MAA message also includes authentication vector from which DSR 100 derives keys usable by the mobile device to access the network. One key that is derived is a master session key which is usable for link-level security when communicating messaging between the mobile device and the cellular network.

Upon receiving the MAA message, DSR 100 stores an expected response to the authentication challenge information and formulates and sends a Diameter EAP answer (DEA) message to client 104. The DEA message includes authentication information, such as an AT_RAND field that contains GSM RAND parameters, AT_AUTN, etc. This information is to be presented to the mobile device seeking authentication. The DEA message may also include an AT_MAC (message authentication code) that contains an authentication code calculated over the EAP payload and used to authenticate the EAP message.

Figure 2B:
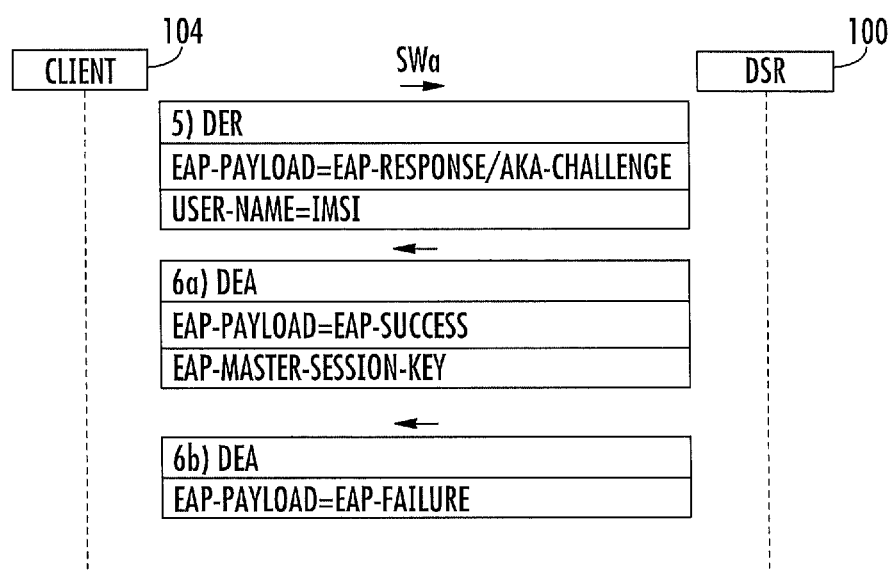
FIG. 2B is a continuation of the message flow illustrated FIG. 2A.

FIG. 2B is a continuation of the message flow illustrated in FIG. 2A. Upon receiving the MAA message including the authentication challenge information, client 104 communicates the challenge information to the mobile device, and the SIM card on the mobile device computes a response to the authentication challenge and communicates the response to client 104. In message 5 in FIG. 2B, which is a Diameter DER message, client 104 communicates the response to DSR 100. Upon receiving the authentication challenge, DSR 100 accesses the stored expected response and determines whether the received response matches the expected response. If the received response matches the expected response, DSR 100 forwards DEA message 6A indicating a successful authentication to client 104, which forwards the message to the mobile device seeking authentication. The DEA message includes the master session key. If the authentication is not successful, DSR 100 sends message 6B, which is a DEA message indicating an EAP authentication failure.

Thus, using these steps illustrated in FIGS. 2A and 2B, DSR 100 functions as an AAA proxy for SWa to SWx authentication and performs protocol interworking between the Diameter SWa and Diameter SWx interfaces. Additional details and variations of the EAP protocol are not illustrated in FIGS. 2A and 2B but can be found in the above-referenced RFC for the EAP protocol.

Figure 3:
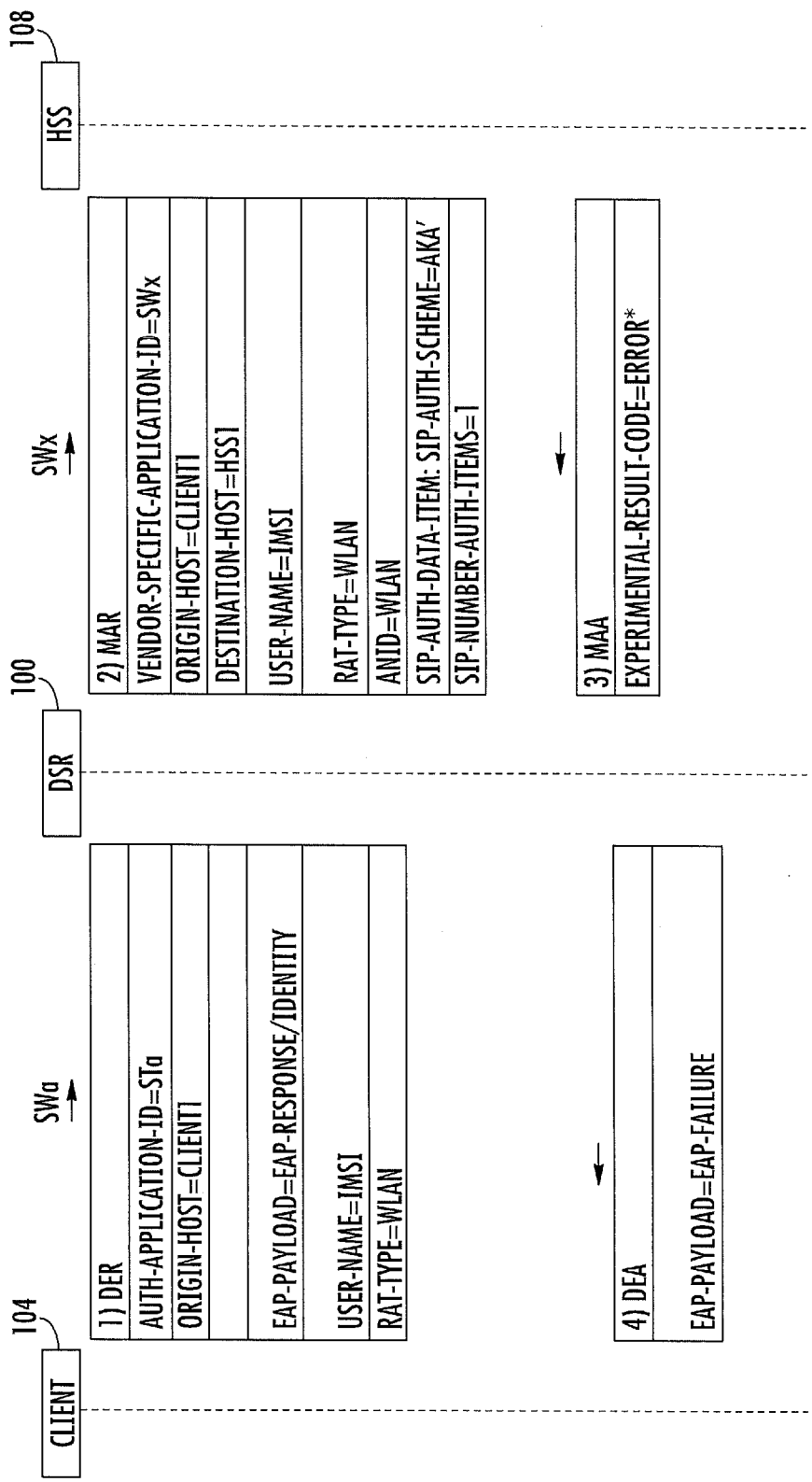
FIG. 3 is a message flow diagram illustrating protocol interworking and authentication proxying by a DSR between a Diameter SWa interface and a Diameter SWx interface where the authentication is rejected by a home subscriber server (HSS) according to an embodiment of the subject matter described herein.

FIG. 3 is a message flow diagram illustrating exemplary messages exchanged for SWa to SWx authentication proxying and protocol interworking when HSS 108 rejects the authentication. In FIG. 3, message 1 and message 2 are the same as those illustrated in FIG. 2A. However, rather than sending a MAA message as message 3, which includes the authentication vectors, HSS 108 sends a result code indicating an error. Such a message may be sent if there is no record for the user in HSS 108. Upon receiving the MAA message, DSR 100 formulates a DEA message indicating an EAP authentication failure and sends the DEA message to client 104 over the SWa interface.

Figure 4A:
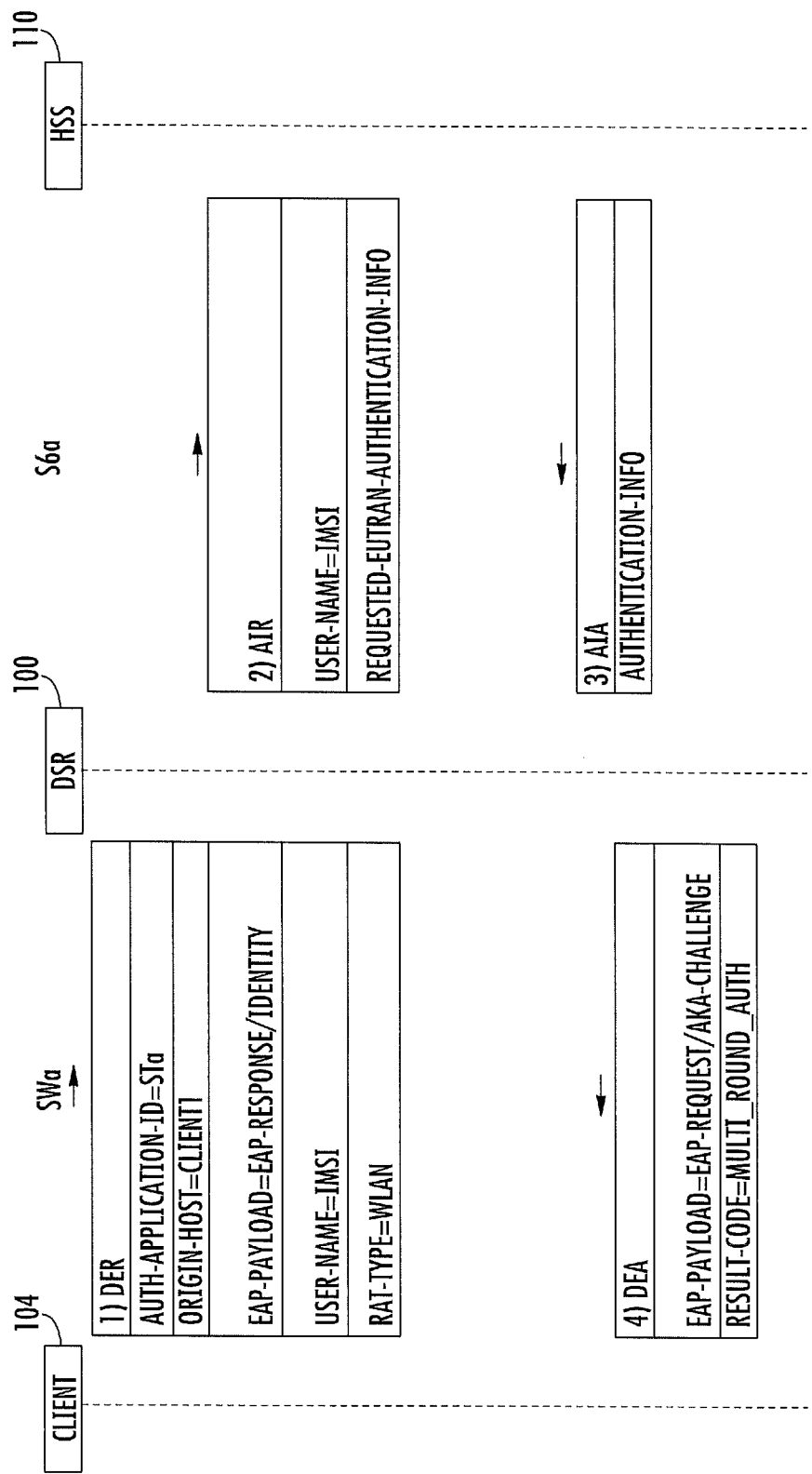
FIG. 4A is a message flow diagram illustrating protocol interworking and authentication proxying by a DSR between a Diameter SWa interface and a Diameter S6a interface according to an embodiment of the subject matter described herein.

As stated above, another type of authentication proxying and protocol interworking that may be performed by DSR 100 is Diameter SWa (or STa, SWm) to Diameter S6a authentication proxying and protocol interworking. FIG. 4A is a message flow diagram illustrating exemplary SWa to S6a authentication proxying and protocol interworking by DSR 100. Not all AVPs may be shown in the messages. Referring to FIG. 4A, when a mobile device seeks access to a cellular network via a non-3GPP access network, client 104 sends message 1, which is a DER message, to DSR 100. The DER message is the same as that illustrated in FIG. 2A. In response to the DER message, DSR 100 formulates and sends message 2, which is a Diameter Authentication Information Request (AIR) message, to HSS 110 over the S6a interface. The AIR message includes the IMSI and requests authentication information from HSS 110.

In response to receiving the AIR message, HSS 110 performs a lookup in its subscriber database using the IMSI to locate the authentication record for the subscriber. If the authentication record exists, HSS 110 formulates an Authentication Information Answer (AIA) message, including the requested authentication information. The authentication information includes authentication challenge information and expected response information. In response to receiving the AIA message, DSR 100 formulates and sends message 4, which is the Diameter DEA message that contains the authentication challenge information.

Figure 4B:
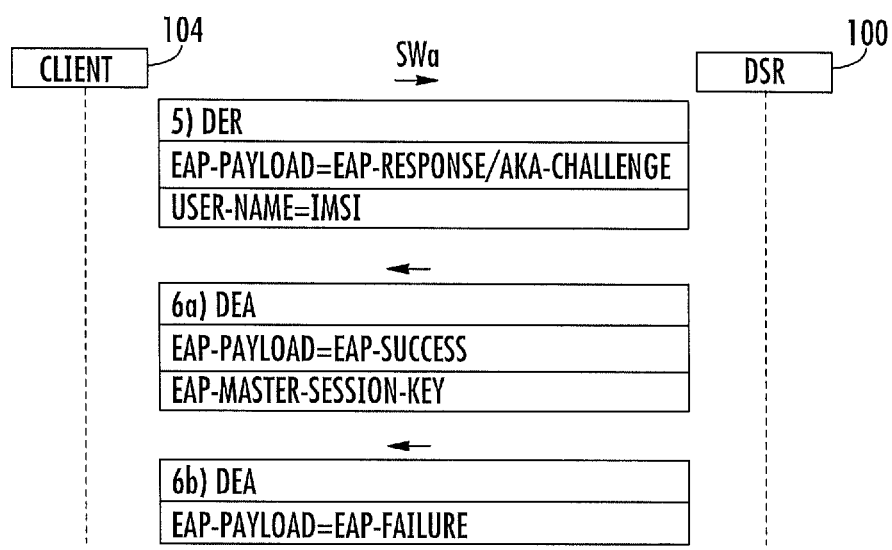
FIG. 4B is a continuation of the message flow illustrated in FIG. 4A.

Referring to FIG. 4B and continuing with the message flow in FIG. 4A, in response to receiving the DEA message, client 104 forwards the authentication challenge information to the mobile device seeking authentication. The mobile device computes a response to the challenge and sends the response back to client 104. In response to receiving the computed response, client 104 forwards a Diameter DER message including the computed response to DSR 100 and the SWa interface. DSR 100 determines whether the received response matches the stored response for the authentication challenge. If the received response matches the stored response, the authentication is successful. If the received response does not match the stored response, the authentication is unsuccessful. If the authentication is successful, DSR 100 sends a DEA message indicating successful authentication, as illustrated by message 6A. If the authentication fails, DSR 100 sends message 6B, which is a DEA message indicating authentication failure. Thus, using the steps illustrated in FIGS. 4A and 4B, DSR 100 performs authentication proxying and protocol interworking between Diameter SWa and Diameter S6a interfaces.

Figure 5A:
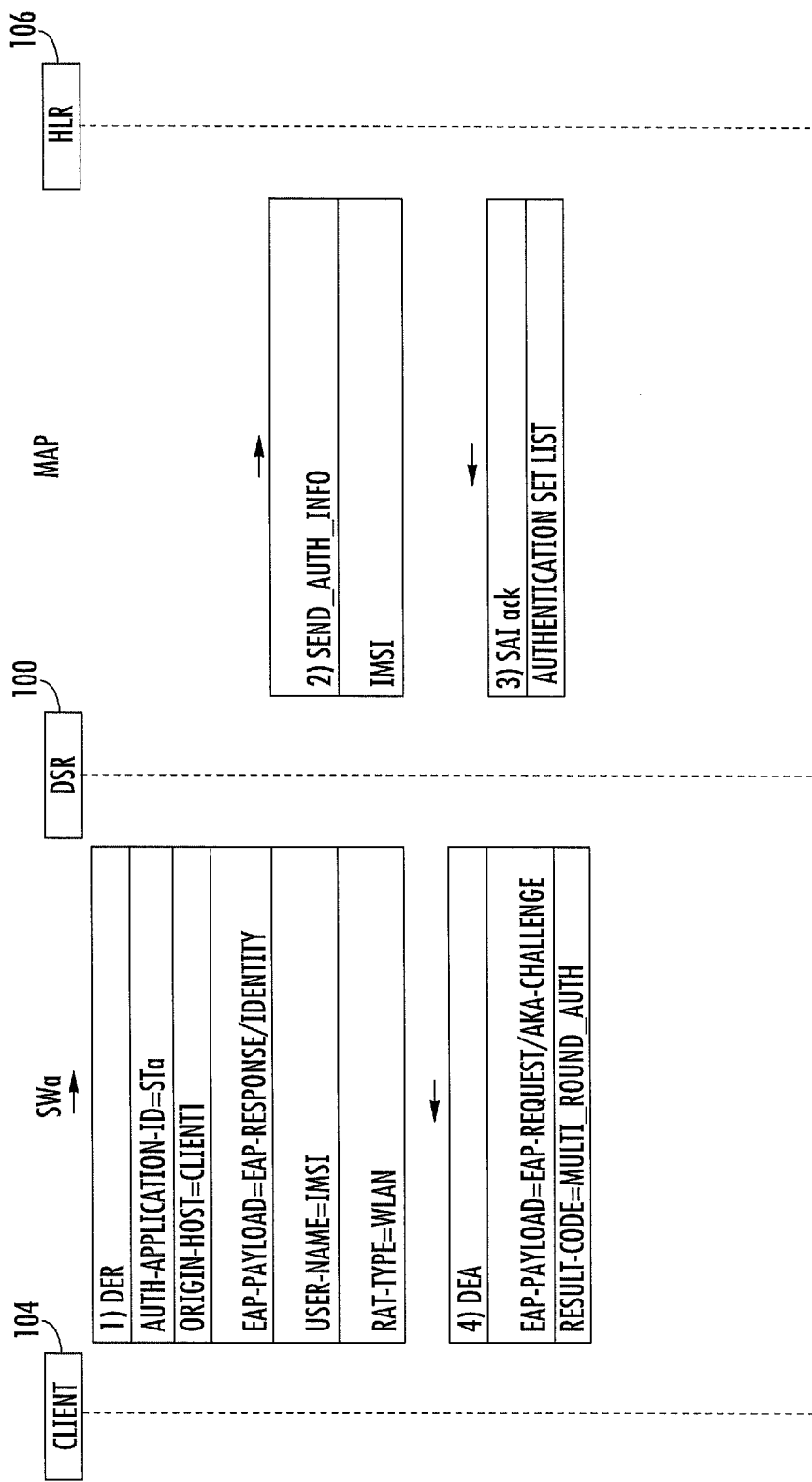
FIG. 5A is a message flow diagram illustrating protocol interworking and authentication proxying by a DSR between a Diameter SWa interface and an SS7 mobile application part (MAP) interface according to an embodiment of the subject matter described herein.

As stated above, another type of authentication proxying and protocol interworking that may be performed by DSR 100 is authentication proxying and protocol interworking for Diameter SWa (or STa, SWm) to MAP. MAP is an SS7-based protocol used for mobility management, registration, and authentication in SS7 networks. FIG. 5A illustrates exemplary messages exchanged for Diameter SWa (or STa, SWm) to MAP authentication proxying and protocol interworking according to an embodiment of the subject matter described herein. Not all AVPs or parameters may be shown in the messages. Referring to FIG. 5A, when a user seeks to access cellular network authentication servers from a non-3GPP network, client 104 sends a Diameter DER message to DSR 100 on the SWa interface. DSR 100, in response to receiving the DER message, formulates and sends to HLR 106 a GSM MAP send authentication information (SAI) message. The SAI message includes the subscriber's IMSI.

In response to receiving the SAI message, HLR 106 performs a lookup in its subscriber database using the IMSI and locates an authentication record for the subscriber. HLR 106 then formulates and sends MAP SAI acknowledge message to DSR 100. The SAI acknowledge message includes authentication challenge information and expected response information.

Upon receiving the SAI acknowledge message, DSR 100 stores the expected response information and forwards the authentication challenge information to client 104 in an EAP payload carried in a DEA message.

Figure 5B:
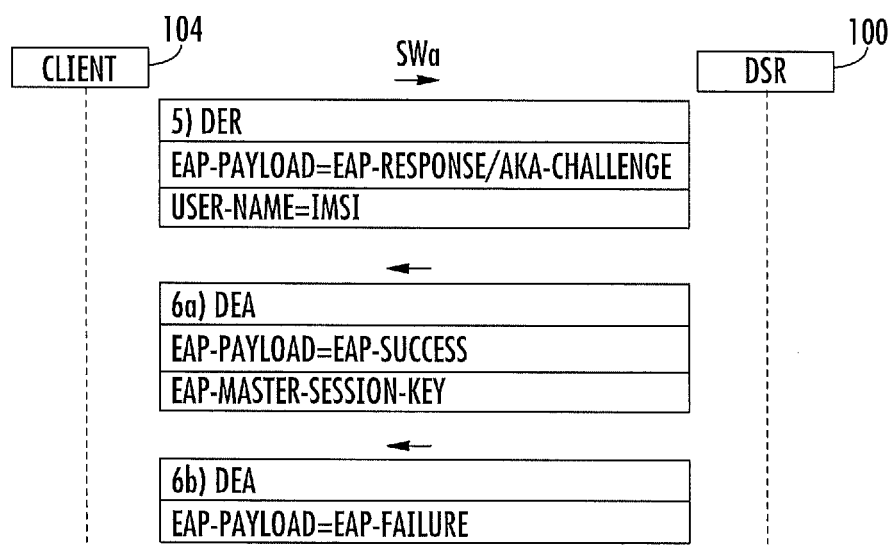
FIG. 5B is a continuation of the message flow diagram of FIG. 5A.

Referring to FIG. 5B, in response to receiving the DEA message, client 104 forwards the authentication challenge information to the mobile device seeking access to the network. The mobile device computes a response to the challenge and communicates the response to client 104. Client 104, in response to receiving the computed response from the mobile device, formulates and sends a Diameter EAP response message to DSR 100 including the response. DSR 100 compares the received response to the stored expected response. If the received response matches the expected response, DSR 100 formulates and sends message 6A, which is a DEA message indicating successful EAP authentication and including the master session key. If the authentication is not successful, DSR 100 formulates and sends message 6B, which is a DEA message indicating authentication failure and which does not include the master session key. Accordingly, as illustrated in FIGS. 5A and 5B, DSR performs authentication proxying and protocol interworking for SWa to MAP authentication.

Figure 6A:
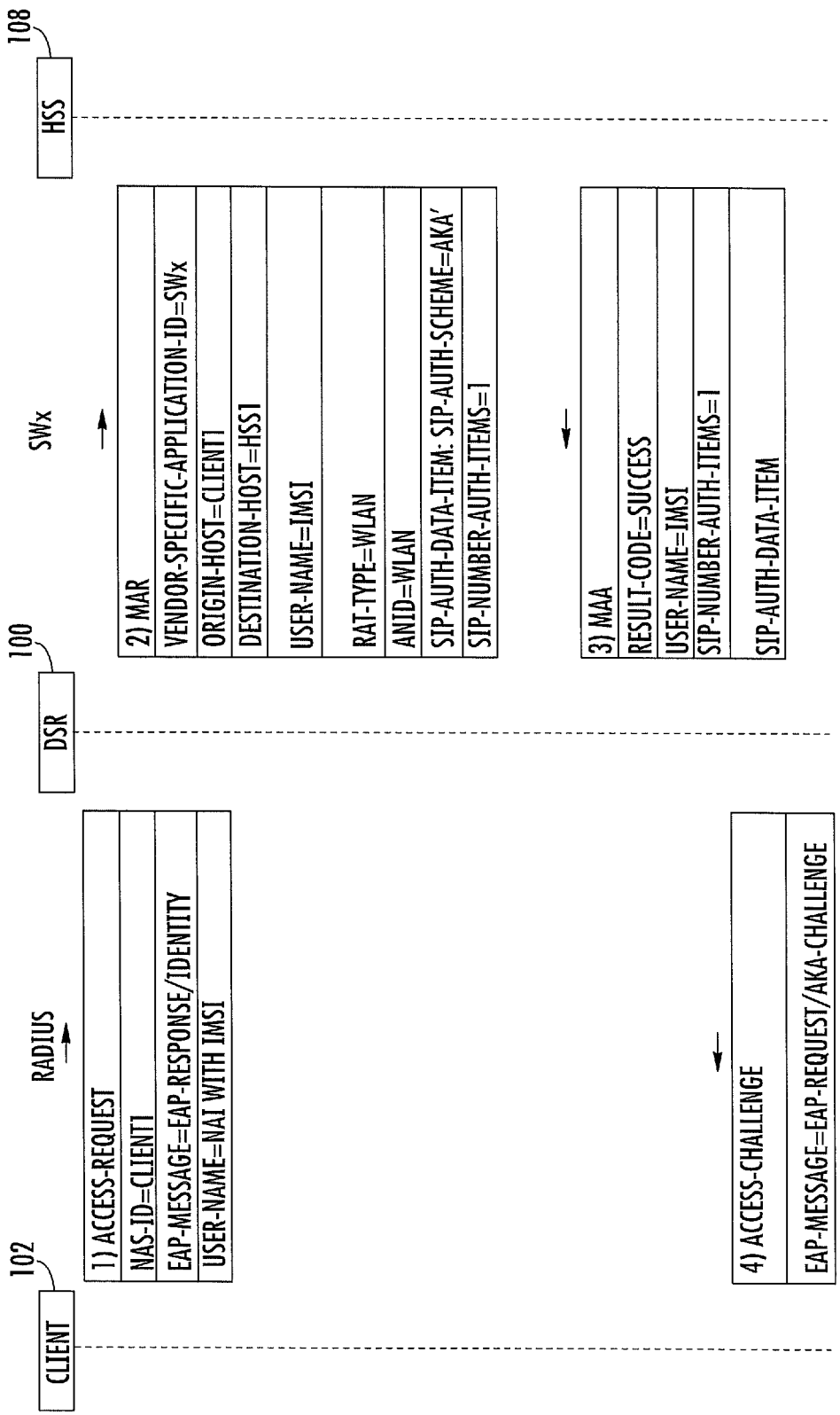
FIG. 6A is a message flow diagram illustrating protocol interworking and authentication proxying by a DSR between a remote authentication dial in user service (RADIUS) interface and a Diameter SWx interface according to an embodiment of the subject matter described herein.

Another type of authentication proxying and protocol interworking that may be performed by DSR 100 is authentication proxying and protocol interworking between a RADIUS interface and a Diameter SWx interface. FIG. 6A illustrates an exemplary message flow for RADIUS to Diameter SWx interworking that may be performed by DSR 100. Not all AVPs or attributes may be shown in the messages. Referring to FIG. 6A, when a mobile device accesses an access network that uses RADIUS and seeks automatic SIM card authentication, client 102 may send a RADIUS access request message with an EAP payload to DSR 100. In response to receiving the access request message, DSR 100 formulates a Diameter MAR message and sends the message to HSS 108 on the SWx interface. The MAR message requests authentication challenge information.

In response to receiving the MAR message, HSS 108 performs a lookup in its subscriber database using the IMSI in the MAR message to locate a record corresponding to the mobile subscriber. In the illustrated example, HSS 108 locates the record and formulates and sends message 3, which is an MAA message that includes authentication vector(s), including an authentication challenge and expected result. HSS 108 sends the MAA message to DSR 100. DSR 100 terminates the Diameter MAA message and formulates a corresponding RADIUS access challenge message. The access challenge message includes an EAP payload with the challenge(s) to be delivered to the mobile device seeking authentication.

Figure 6B:
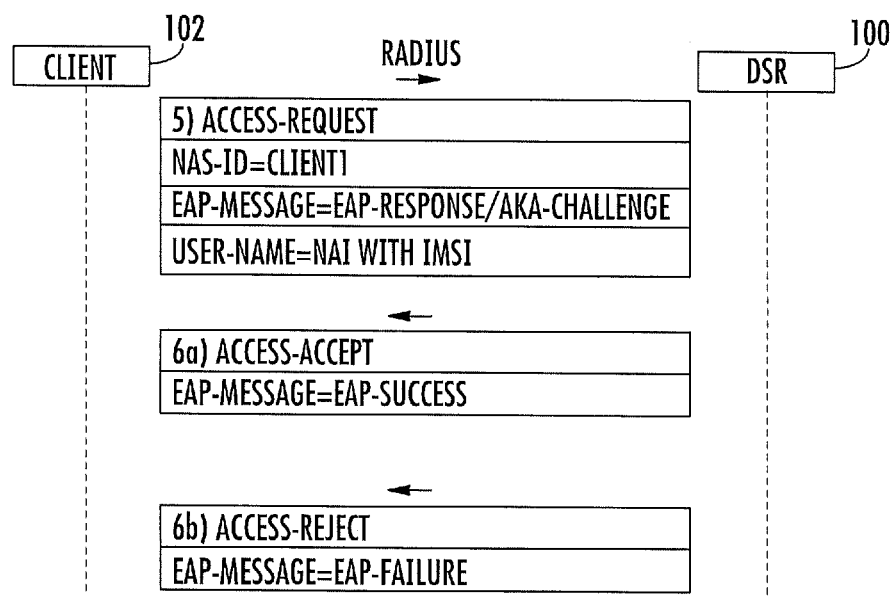
FIG. 6B is a continuation of the message flow diagram illustrated in FIG. 6A.

Referring to FIG. 6B, in response to receiving the RADIUS access challenge message, client 102 forwards the authentication challenge information to the mobile device seeking access to the network. The mobile device seeking access to the network formulates the challenge response and sends the challenge the response to client 102. Client 102 formulates message 5, which is a RADIUS access request message including the computed access challenge information. Client 102 sends the access request message to DSR 100. DSR 100 compares the challenge response in the access request message to the expected response. If the challenge response is equal to the expected response, DSR 100 formulates message 6A, which is a RADIUS access accept message with an EAP message indicating successful authentication. If the received response is not equal to the expected response, DSR 100 formulates and sends message 6B, which is a RADIUS access reject message indicating an authentication failure.

Figure 7A:
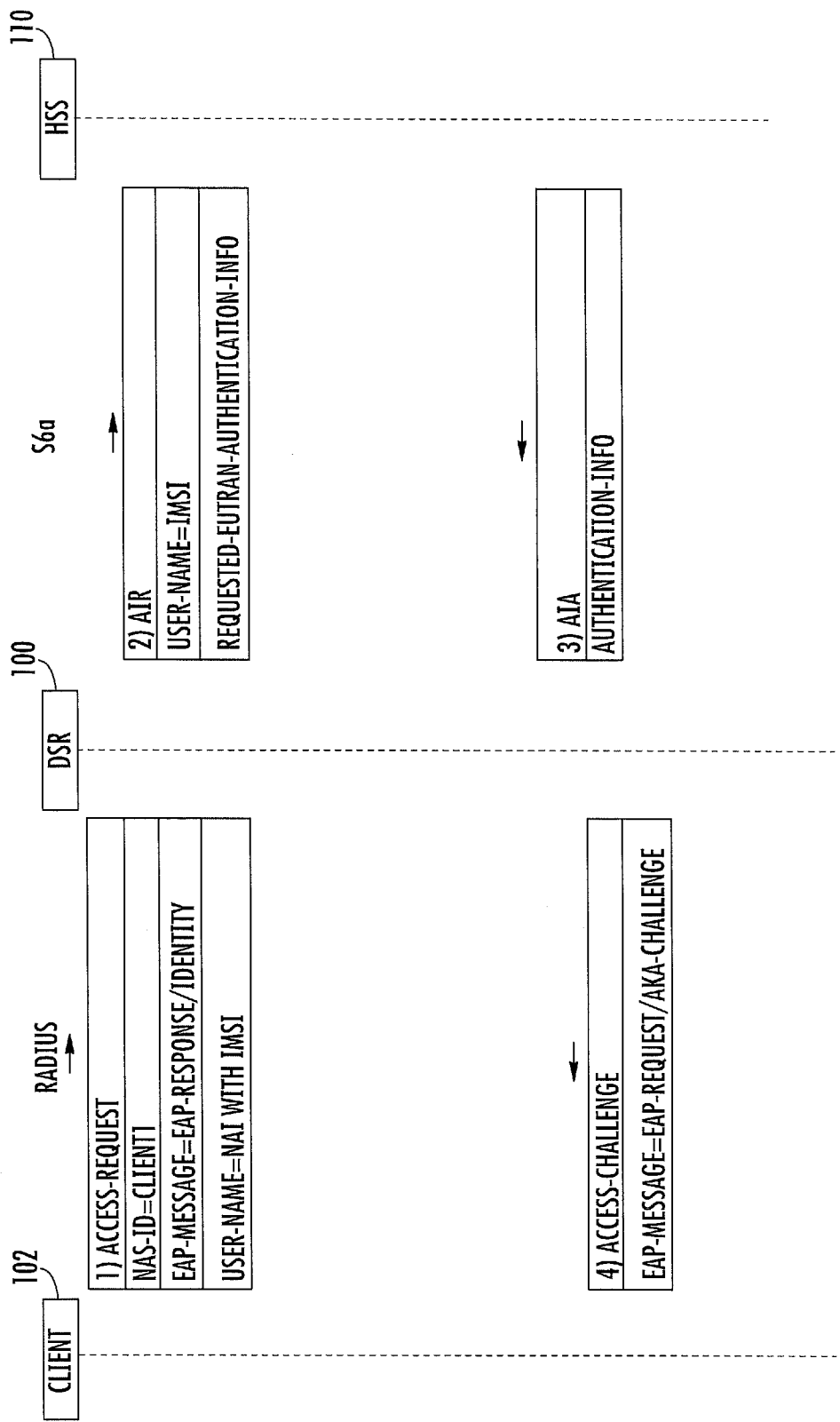
FIG. 7A is a message flow diagram illustrating protocol interworking and authentication proxying by a DSR between a RADIUS interface and a Diameter S6a interface according to an embodiment of the subject matter described herein.

Yet another type of authentication proxying and protocol interworking that may be performed by DSR 100 is RADIUS to Diameter S6a authentication proxying and protocol interworking. FIG. 7A is a message flow diagram illustrating exemplary messages exchanged in performing RADIUS to Diameter S6a authentication interworking and protocol proxying according to an embodiment of the subject matter described herein. Not all AVPs or attributes may be shown in the messages. Referring to FIG. 7A, when a mobile device seeks automatic SIM card authentication from an access network that uses RADIUS, the mobile device sends an authentication request to client 102. Client 102 formulates and sends a RADIUS access request message to DSR 100. In response to receiving the RADIUS access request message, DSR 100 formulates and sends a Diameter AIR message to HSS 110 on the S6a interface. In response to the AIR message, HSS 110 performs a lookup in its subscriber database to locate a record for the mobile subscriber. If the record is located, HSS 110 responds with message 3, which is a Diameter AIA message containing authentication vector(s). HSS 110 sends the Diameter AIA message to DSR 100. In response to receiving the Diameter AIA message, DSR 100 formulates and sends a RADIUS access challenge message including the challenge information and sends the message to client 102.

Figure 7B:
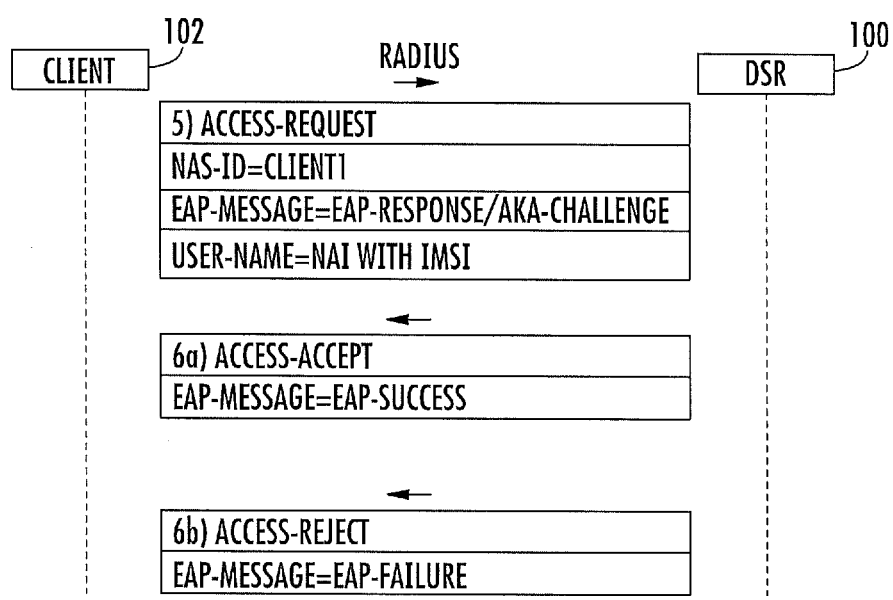
FIG. 7B is a continuation of the message flow diagram illustrated in FIG. 7A.

Referring to FIG. 7B, when client 102 receives the RADIUS access challenge message, client 102 sends the challenge information to the mobile device seeking authentication. The mobile device seeking authentication computes the challenge response and delivers the response to client 102. Client 102 formulates and sends message 5 to DSR 100. Message 5 is a RADIUS access request message including the computed challenge response information. DSR 100 compares the received challenge response with the stored challenge response. If the received challenge response is equal to the stored challenge response, DSR 100 responds with message 6A, which is a RADIUS access accept message indicating successful authentication. If the received authentication response does not match the stored response, DSR 100 formulates and sends message 6B, which is a RADIUS access reject message indicating authentication failure. Thus, DSR 100 functions as an AAA proxy and performs RADIUS to Diameter S6a protocol interworking.

Figure 8A:
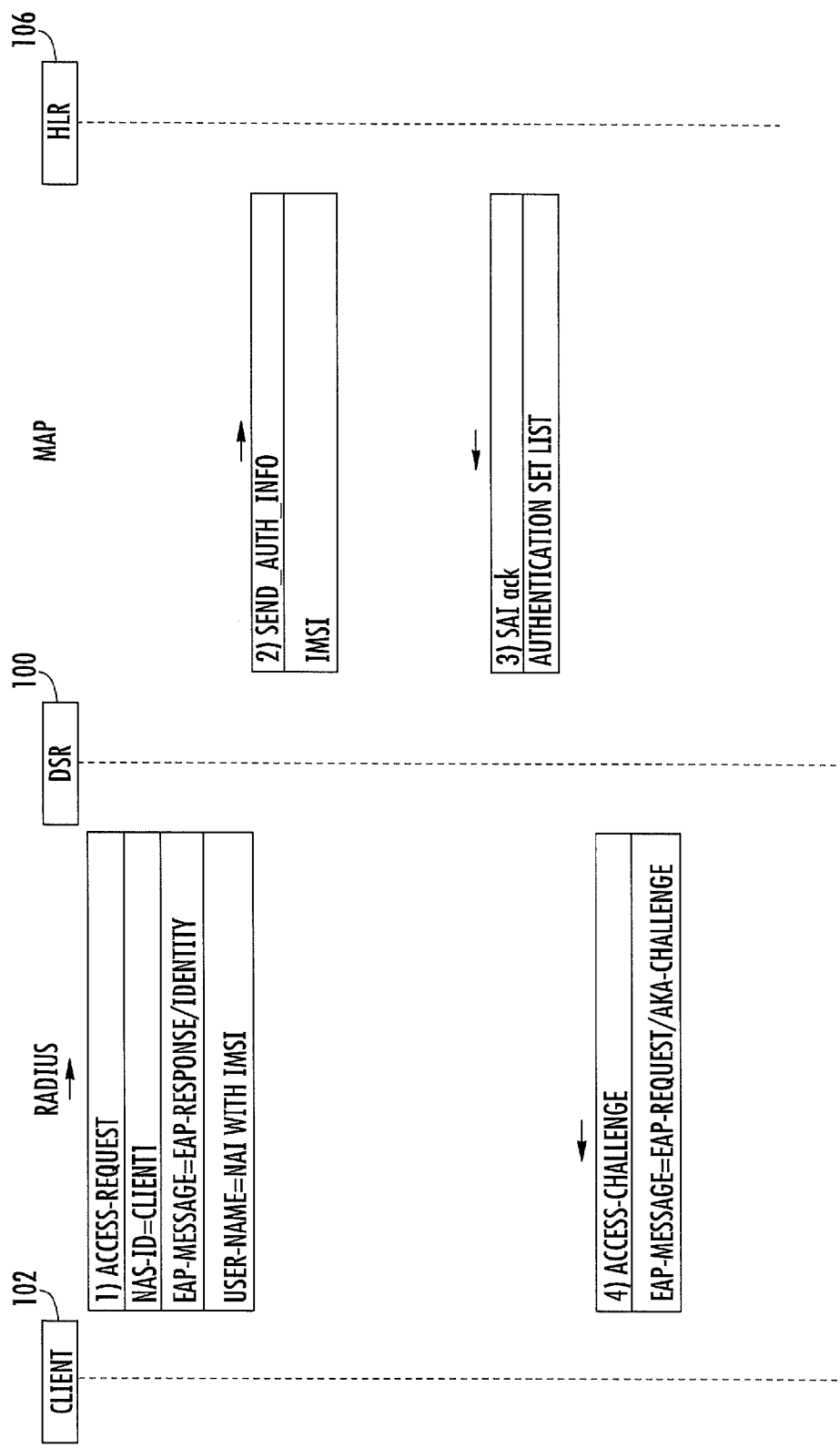
FIG. 8A is a message flow illustrating protocol interworking and authentication proxying by a DSR between a RADIUS interface and a MAP interface according to an embodiment of the subject matter described herein.

Yet another type of authentication proxying and protocol interworking that may be performed by DSR 100 is RADIUS to SS7 MAP authentication proxying and protocol interworking. FIG. 8A illustrates exemplary messaging exchanged for RADIUS to SS7 MAP authentication proxying and protocol interworking. Not all attributes or parameters may be shown in the messages. Referring to FIG. 8A, when a mobile device accesses a network managed by client 102, client 102 sends a RADIUS access request message to DSR 100. The access request message may include information for identifying the subscriber. DSR 100 terminates the access request message and formulates and sends a MAP SAI message to HLR 106. Upon receiving the SAI message, HLR 106 performs a lookup in its subscriber database to locate a record corresponding to the subscriber seeking authentication. If a record exists, HLR 106 sends an SAI acknowledge message including authentication information to DSR 100. DSR 100 stores the expected response and sends a RADIUS access challenge message including the authentication challenge information to client 102.

Figure 8B:
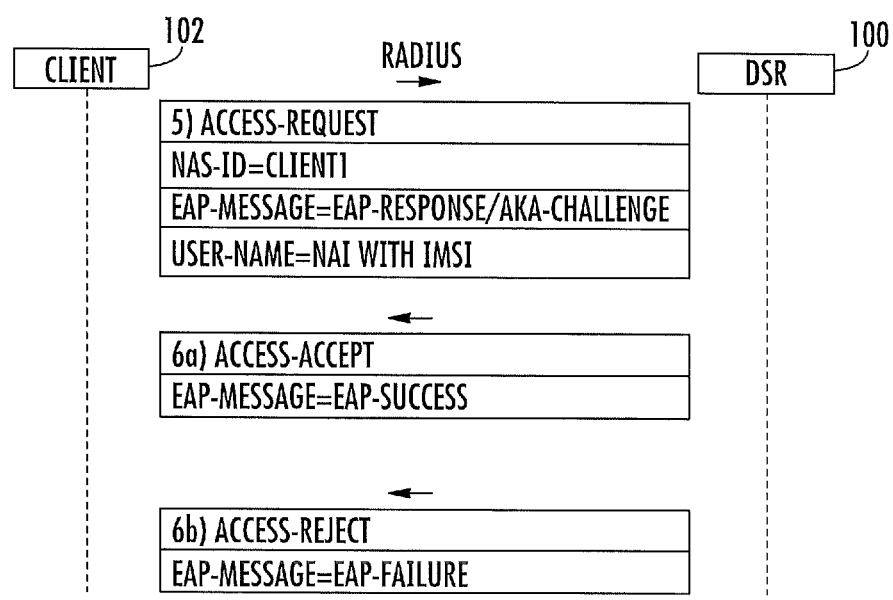
FIG. 8B is a continuation of the message flow illustrated in FIG. 8A.

Referring to FIG. 8B, when client 102 receives the access challenge information, client 102 provides the challenge information to the mobile device seeking authentication. The mobile device computes a response to the challenge and delivers the response to client 102. Client 102 inserts the response information in a RADIUS access request message and sends the message to DSR 100. DSR 100 compares the received response with the stored response. If the received response matches the stored response, DSR 100 responds with message 6A, which is a RADIUS access accept message. If the received access response does not match the stored response, DSR 100 responds with message 6B, which is a RADIUS access reject message indicating an authentication failure. Thus, DSR 100 according to an embodiment of the subject matter described herein performs RADIUS to MAP authentication proxying and protocol interworking.

Figure 9:
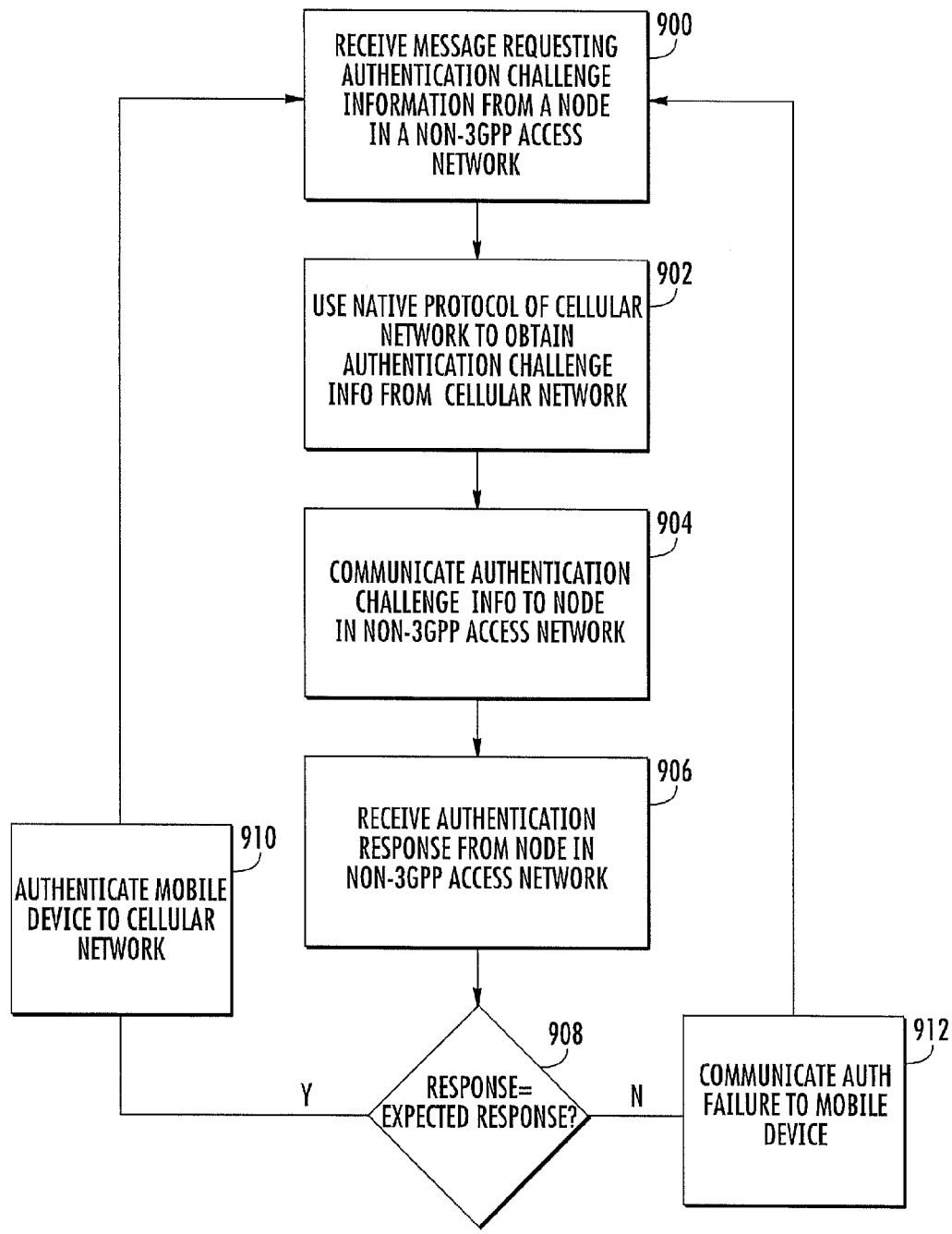
FIG. 9 is a flow chart illustrating an exemplary process for access network protocol interworking and authentication proxying according to an embodiment of the subject matter described herein.

FIG. 9 is a flow chart illustrating an exemplary process for authentication proxying and protocol interworking according to an embodiment of the subject matter described herein. Referring to FIG. 9 in step 900, a message requesting authentication information is received. The message may originate from a node in a non-3GPP access network. The message may be received by DSR 100 and may be any of the types described above, e.g., RADIUS, Diameter, or other protocol. If the message is a Diameter protocol message, the message may be a Diameter SWa message, a Diameter STa message, or a Diameter SWm message.

In step 902, the native protocol of the cellular network is used to obtain authentication challenge information from the cellular network. For example, DSR 100 may use Diameter or MAP signaling to obtain authentication challenge information from an HLR or an HSS. If Diameter signaling is used, the type of message used to communicate with the node in the cellular network may be a Diameter S6a message. The DSR may store the authentication challenge information as state information for the authentication session.

In step 904, the authentication challenge information is communicated to the node in the access network that sent the access request message. For example, DSR 100 may send a RADIUS, Diameter, or other protocol message to communicate the challenge information to the node in the access network. If the message is a Diameter protocol message, the message may be a Diameter SWa message, a Diameter STa message, or a Diameter SWm message.

The node in the access network may communicate the challenge information to the mobile device seeking authentication. The mobile device may compute the required challenge response and send the response to the access point or the client node. The client node may send this information to the DSR in an authentication response message. The authentication response message may be a RADIUS message or a Diameter protocol message, such as a Diameter SWa message, a Diameter STa message, or a Diameter SWm message. In step 906, the DSR receives the authentication response from the node in the access network.

In step 908, the DSR determines whether the response matches the expected response. Determining whether the response matches the expected response may include accessing the state information stored by the DSR for the authentication session and determining whether the state information matches the authentication response computed by the mobile device.

If the response matches the expected response, control proceeds to step 910 where the DSR authenticates the mobile device to the cellular network by communicating the successful authentication to the device via the client. Control then returns to step 900 for processing the next authentication request. If, on the other hand, the response does not equal the expected response, control proceeds to step 912 where an indication of authentication failure is communicated to the mobile device. Control then proceeds to step 900 to process the next authentication request. Thus, using these steps illustrated in FIG. 9, a DSR may perform seamless authentication proxying and protocol interworking for a variety of different access network protocols and interfaces.

Figure 10:
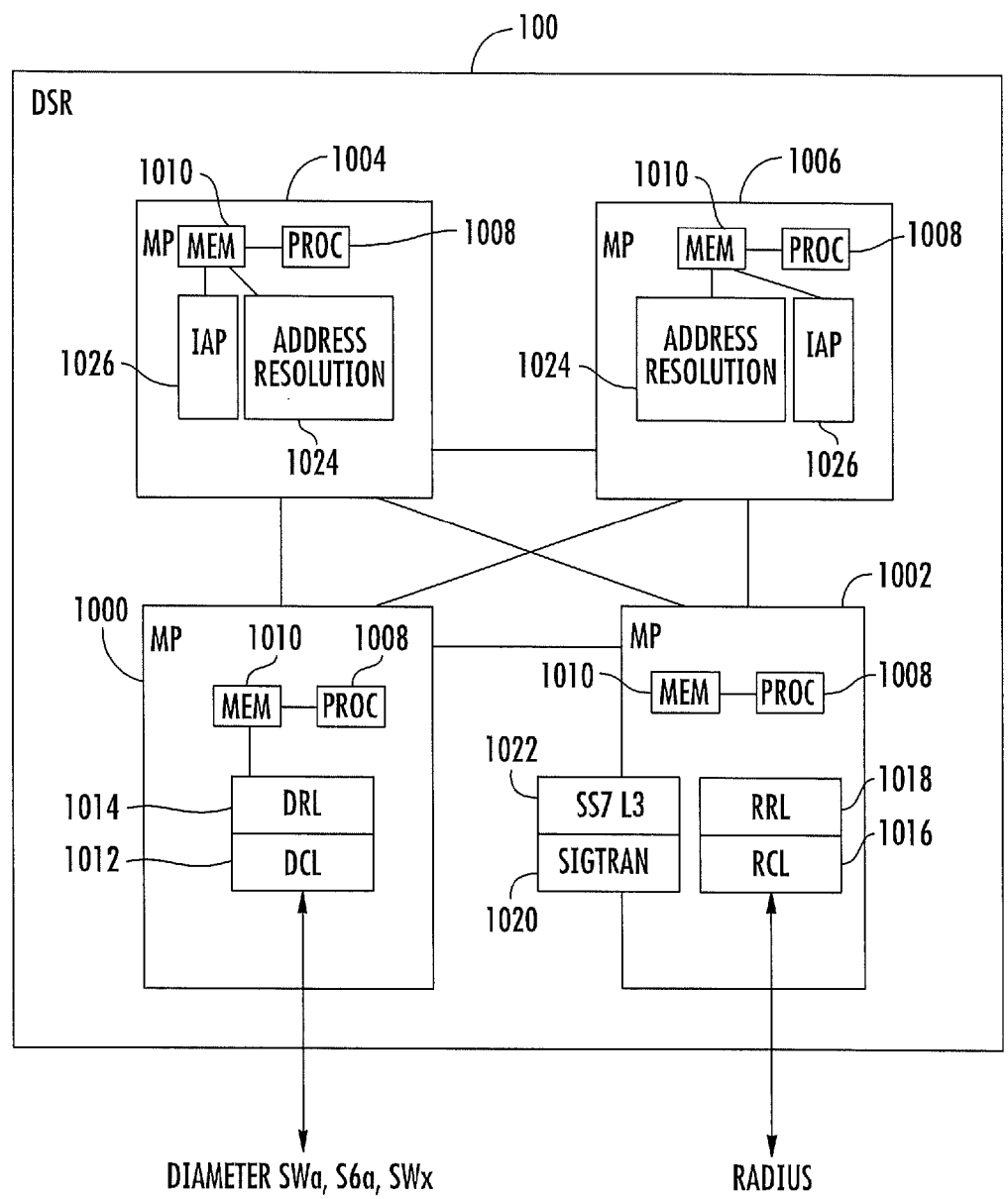
FIG. 10 is a block diagram of a DSR implementing an interworking and authentication proxy according to an embodiment of the subject matter described herein.

As stated above, authentication proxying and protocol interworking as described herein may be implemented on a DSR. FIG. 10 is a block diagram illustrating an exemplary architecture for DSR that implements authentication proxying and protocol and interworking according to an embodiment of the subject matter described herein. Referring to FIG. 10, DSR 100 includes a plurality of message processors 1000, 1002, 1004, and 1006 that perform various functions associated with Diameter routing, protocol interworking, and authentication proxying. Each message processor 1000, 1002, 1004, and 1006 may be implemented as a printed circuit board or blade that includes at least one processor 1008 and memory 1010. Message processors 1000, 1002, 1004, and 1006 may be connected to each other via a bus or other suitable internal connection. A hypervisor (not shown in FIG. 10) may execute on each message processor 1000, 1002, 1004, and 1006 to virtualize access to underlying hardware resources, allowing the Diameter routing, protocol interworking, and authentication proxying components described herein to execute in virtual machine environments.

In the illustrated example, message processor 1000 includes a Diameter connection layer (DCL) 1012 and a Diameter routing layer (DRL) 1013. DCL 1012 performs functions for establishing Diameter connections with other nodes over Diameter interfaces, such as SWa, S6a and SWx interfaces. DRL 1014 routes messages based on Diameter level information in the messages.

Message processor 1002 includes a RADIUS connection layer (RCL) 1016 that establishes and maintains RADIUS connections with other nodes. Message processor 1002 also includes a RADIUS routing layer (RRL) 1018 that routes RADIUS messages based on RADIUS level information in the messages. Message processor 1002 also includes a SIGTRAN layer 1020 that implements transport layer services for SS7 messages. Message processor 1002 also includes an SS7 level 3 routing function 1022 that routes SS7 messages based on SS7 level 3 information in the messages. In an alternate implementation, RADIUS messages may be encapsulated in Diameter messages for internal distribution within DSR 100, and RRL 1018 may be replaced by a Diameter routing layer.

Message processor 1004 includes an address resolution module 1024 that performs range based address resolution and individual subscriber identifier address resolution for RADIUS, Diameter, and SS7 messages. Such address resolution may include performing a lookup based on an IMSI or an MSISDN number in a message to determine the appropriate destination for the message and inserting the routing information in the messages for routing the messages to the appropriate destination. Message processor 1004 may also include an interworking and authentication proxy (IAP) 1026 that performs the authentication proxying and protocol interworking functions described herein. For example, IAP 1026 may perform the RADIUS, Diameter, and MAP interworking functions required to authenticate users seeking access to the cellular network via a non-3GPP access network. Message processor 1006 may be identically provisioned to message processor 1004 and may be provided for redundancy or load sharing purposes.

Thus, when a Diameter message arrives at message processor 1000, DRL 1014 determines whether authentication proxying and protocol interworking processing is required. If such processing is required, DRL 1014 sends the message to one of messaging processors 1004 and 1006 for authentication proxying and protocol interworking. IAP 1026 on the receiving message processor performs the required authentication proxying function and formulates the outbound message. Address resolution may be performed to determine the routing information for the outbound message. IAP 1026 or address resolution module 1024 forwards the message to the appropriate message processor 1000 or 1002 with the message is forwarded to its intended next hop.

Accordingly, the architecture illustrated in FIG. 10 is a special purpose machine that performs protocol interworking and authentication proxying for authenticating users on different types of access networks using plural different types of cellular network authentication interfaces. The architecture illustrated in FIG. 10 improves the functionality of both access and cellular networks by seamlessly authenticating mobile devices to those networks without requiring the user to manually enter usernames and passwords. Seamless SIM card authentication regardless of the type of cellular network of a mobile device can be provided.

What is claimed is:
1. A method for access network protocol interworking and authentication proxying comprising:

in a Diameter signaling router (DSR) including at least one processor:
  receiving, from a remote authentication dial in user service (RADIUS) client in an access network that supports extensible authentication protocol (EAP) authentication, a RADIUS access request message with an EAP payload;
  using a native protocol of a cellular network to obtain authentication challenge information from the cellular network, wherein the native protocol comprises Diameter and wherein using the native protocol comprises sending a first Diameter message to a home subscriber server (HSS) supporting Diameter authentication;
  receiving, from the HSS, a second Diameter message including the authentication challenge information;
  storing state information for determining an expected response to the authentication challenge information;
  communicating the authentication challenge information to the RADIUS client in the access network by transmitting a RADIUS access challenge message to the RADIUS client;
  receiving an authentication response from the RADIUS client in the access network;
  determining whether the authentication response matches the expected response using the stored state information; and
  in response to determining that the authentication response matches the expected response, sending a message to the RADIUS client in the access network indicating successful authentication.

2. The method of claim 1 wherein the first Diameter message comprises a Diameter S6a message.

3. The method of claim 1 wherein the first Diameter message comprises a Diameter SWx message.

4. A system for interworking and authentication proxying, the system comprising:
  a Diameter signaling router (DSR) including at least one message processor;
  an authentication and internetworking proxy implemented by the at least one message processor and configured for:
    receiving, from a remote authentication dial in user service (RADIUS) client in an access network that supports extensible authentication protocol (EAP) authentication, a RADIUS access request message with an EAP payload;
    using a native protocol of a cellular network to obtain authentication challenge information from the cellular network, wherein the native protocol comprises Diameter and wherein using the native protocol comprises sending a first Diameter message to a home subscriber server (HSS) supporting Diameter authentication;
    receiving, from the HSS, a second Diameter message including the authentication challenge information;
    storing state information for determining an expected response to the authentication challenge information;
    communicating the authentication challenge information to the RADIUS client in the access network by transmitting a RADIUS access challenge message to the RADIUS client;
    receiving an authentication response from the RADIUS client in the access network;
    determining whether the authentication response matches the expected response using the stored state information; and
    in response to determining that the authentication response matches the expected response, sending a message to the RADIUS client in the access network indicating successful authentication.

5. The system of claim 4 wherein the Diameter message comprises a Diameter S6a message.

6. The system of claim 4 wherein the Diameter message comprises a Diameter SWx message.

7. A non-transitory computer readable medium having stored thereon executable instructions that when executed by the processor on a computer control the computer to perform steps comprising:
  receiving, from a remote authentication dial in user service (RADIUS) client in an access network that supports extensible authentication protocol (EAP) authentication, a RADIUS access request message with an EAP payload;
  using a native protocol of a cellular network to obtain authentication challenge information from the cellular network, wherein the native protocol comprises Diameter and wherein using the native protocol comprises sending a first Diameter message to a home subscriber server (HSS) supporting Diameter authentication;
  receiving, from the HSS, a second Diameter message including the authentication challenge information;
  storing state information for determining an expected response to the authentication challenge information;
  communicating the authentication challenge information to the RADIUS client in the access network by transmitting a RADIUS access challenge message to the RADIUS client;
  receiving an authentication response from the RADIUS client in the access network;
  determining whether the authentication response matches the expected response using the stored state information; and
  in response to determining that the authentication response matches the expected response, sending a message to the RADIUS client in the access network indicating successful authentication.

\* \* \* \* \*

UNITED STATES PATENT AND TRADEMARK OFFICE
CERTIFICATE OF CORRECTION

PATENT NO.        : 9,668,134 B2
APPLICATION NO.   : 14/827015
DATED             : May 30, 2017
INVENTOR(S)       : McCann It is certified that error appears in the above-identified patent and that said Letters Patent is hereby corrected as shown below:

On page 3, Column 2, under Other Publications, Line 42, delete "Patnet" and insert -- Patent --, therefor.

On page 3, Column 2, under Other Publications, Line 52, delete "Applicaton" and insert -- Application --, therefor.

On page 5, Column 1, under Other Publications, Line 18, delete "Transmital" and insert -- Transmittal --, therefor.

On page 5, Column 2, under Other Publications, Line 59, delete "Requirment" and insert -- Requirement --, therefor.

On page 6, Column 1, under Other Publications, Line 25, delete "X.50013" and insert -- X.S0013 --, therefor.

On page 6, Column 1, under Other Publications, Line 28, delete "X.50013" and insert -- X.S0013 --, therefor.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*